(12) United States Patent
Lin et al.

(10) Patent No.: US 12,553,159 B2
(45) Date of Patent: Feb. 17, 2026

(54) MOISTURE-RESPONSE DEFORMING FABRIC

(71) Applicant: TAIWAN TEXTILE RESEARCH INSTITUTE, New Taipei (TW)

(72) Inventors: Wei-Hsiang Lin, New Taipei (TW);
Po-Hsun Huang, New Taipei (TW);
Jen-Chi Chao, New Taipei (TW);
Ta-Chung An, New Taipei (TW);
Shu-Hui Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 841 days.

(21) Appl. No.: 17/815,291

(22) Filed: Jul. 27, 2022

(65) Prior Publication Data

US 2023/0183892 A1    Jun. 15, 2023

(30) Foreign Application Priority Data

Dec. 13, 2021   (TW) .................. 110146632

(51) Int. Cl.
| | |
|---|---|
| *D03D 15/50* | (2021.01) |
| *D03D 15/283* | (2021.01) |
| *D04B 1/10* | (2006.01) |
| *D04B 21/08* | (2006.01) |

(52) U.S. Cl.
CPC .......... *D03D 15/50* (2021.01); *D03D 15/283* (2021.01); *D04B 1/10* (2013.01); *D04B 21/08* (2013.01); *D10B 2331/02* (2013.01); *D10B 2401/02* (2013.01); *D10B 2501/00* (2013.01)

(58) Field of Classification Search
CPC ........ D03D 15/50; D03D 15/283; D04B 1/16; D04B 1/20; D04B 1/10; D04B 1/102; D04B 1/104; D04B 1/12; D04B 21/08; Y02P 70/62; D10B 2331/02; D10B 2401/02; D10B 2401/10; D10B 2501/00
USPC ....................................... 442/301
See application file for complete search history.

(56) References Cited

U.S. PATENT DOCUMENTS

| | | |
|---|---|---|
| 2008/0132133 A1 | 6/2008 | Yasui et al. |
| 2021/0332187 A1 | 10/2021 | Huang et al. |

FOREIGN PATENT DOCUMENTS

| | | | |
|---|---|---|---|
| CN | 103015017 A | 4/2013 | |
| CN | 110983585 B | 12/2020 | |
| EP | 3 346 034 A1 | 7/2018 | |
| FR | 2746818 A1 * | 10/1997 | ............ D04B 21/04 |
| TW | 507028 B | 10/2002 | |
| TW | 200615412 A | 5/2006 | |
| TW | 201009148 A | 3/2010 | |
| TW | I366613 B | 6/2012 | |
| TW | 201343996 A | 11/2013 | |
| TW | I413715 B | 11/2013 | |
| TW | I439589 B | 6/2014 | |
| TW | I542746 B | 7/2016 | |

\* cited by examiner

*Primary Examiner* — Camie S Thompson
(74) *Attorney, Agent, or Firm* — McClure, Qualey & Rodack, LLP (57) ABSTRACT

A moisture-response deforming fabric includes 40 parts by weight to 70 parts by weight of an ordinary yarn and 30 parts by weight to 60 parts by weight of a moisture-response stretching nylon yarn. A water-vapour permeability index (imt) of the moisture-response deforming fabric is greater than or equal to 0.35 under a measurement of the validation FTTS-FP-161.

5 Claims, 14 Drawing Sheets

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| dial 4 | | | | | | | | | | | | | | | | | | | | |
| dial 3 | | | | | | | | | | | | | | | | | | | | |
| dial 2 | < | — | < | — | < | — | < | — | < | — | < | — | < | — | < | — | < | — | < | < |
| dial 1 | — | — | < | — | < | — | < | — | < | — | < | — | < | — | < | — | < | — | < | < |
| needle cylinder 1 | < | < | — | < | — | < | — | < | — | < | — | < | — | < | — | < | — | < | — | — |
| needle cylinder 2 | < | < | < | — | ⊔ | < | < | — | ⊔ | < | < | — | ⊔ | < | < | — | ⊔ | < | ⊔ | — |
| needle cylinder 3 | | | | | | | | | | | | | | | | | | | | |
| needle cylinder 4 | | | | | | | | | | | | | | | | | | | | |
| yarn type | T | N | T | N | T | N | T | N | T | N | T | N | T | N | T | N | T | N | T | N |

Fig. 2A

| dial needle | 1 | 2 | | | | | | | | | | | | | | |
|---|---|---|---|---|---|---|---|---|---|---|---|---|---|---|---|---|
| under needle | 2 | 1 | 1 | 1 | 1 | 1 | 1 | 1 | 1 | 1 | 1 | 1 | 1 | 1 | 1 | 1 |

Fig. 2B

| | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| dial | 4 | | | | | | | | | | | | | | | | | | | | |
| | 3 | | | | | | | | | | | | | | | | | | | | |
| | 2 | ⊓ | < | < | — | < | < | — | < | < | — | < | < | — | < | < | — | < | < | | |
| | 1 | ⊓ | < | < | — | < | < | — | < | < | — | < | < | — | < | < | — | < | < | | |
| needle cylinder | 1 | < | — | — | < | — | — | < | — | — | < | — | — | < | — | — | < | | | | |
| | 2 | < | — | — | < | — | — | < | — | — | < | — | — | < | — | — | < | | | | |
| | 3 | < | — | — | < | — | — | < | — | — | < | — | — | < | — | — | < | | | | |
| | 4 | | | | | | | | | | | | | | | | | | | | |
| yarn type | | T | N | N | T | N | N | T | N | N | T | N | N | T | N | N | T | N | N | | |

Fig. 3A

| dial needle | 1 | 2 | | |
|---|---|---|---|---|
| under needle | 1 | 2 | 1 | 3 |

Fig. 3B

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| dial 4 | | | | | | | | | | | | | | | | | | | | | | | | |
| dial 3 | | | | | | | | | | | | | | | | | | | | | | | | |
| dial 2 | < | — | < | — | < | — | | | | | | | | | < | — | < | — | | | | | | |
| dial 1 | — | < | — | < | — | < | | | | | | | — | < | — | < | — | < | | | | | | |
| needle/cylinder 1 | < | < | < | — | — | — | < | — | < | — | — | — | — | — | — | — | — | — | < | — | < | — | < | — |
| needle/cylinder 2 | — | — | — | — | — | — | — | < | — | < | — | < | — | < | — | < | — | < | — | < | — | < | — | < |
| needle/cylinder 3 | — | — | — | — | — | — | < | — | < | — | < | — | — | — | — | — | — | — | < | — | < | — | < | — |
| needle/cylinder 4 | — | — | — | — | — | — | — | < | — | < | — | < | < | < | < | < | — | — | — | < | — | < | — | < |
| yarn type | N | N | N | N | N | N | T | T | T | T | T | T | N | N | N | N | N | N | T | T | T | T | T | T |

Fig. 4A

| dial needle | 1 | 2 | | | | | | |
|---|---|---|---|---|---|---|---|---|
| under needle | 1 | 2 | 3 | 4 | 4 | 3 | 2 | 1 |

Fig. 4B

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| dial 4 | | | | | | | | | | | | | | | | | | | | |
| dial 3 | < | | < | | < | | < | | < | | < | | < | | < | | < | | < | |
| dial 2 | | — | < | — | < | — | < | — | < | — | < | — | < | — | < | — | < | — | < | < |
| dial 1 | < | — | — | — | — | — | — | — | — | — | — | — | — | — | — | — | — | — | — | — |
| needle cylinder 1 | < | < | < | < | < | < | < | < | < | < | < | < | < | < | < | < | < | < | — | < |
| dial 2 nc | < | < | — | — | ⊏ | < | < | — | ⊏ | < | < | — | ⊏ | < | < | — | ⊏ | < | ⊏ | |
| needle cylinder 3 | | | | | | | | | | | | | | | | | | | | |
| needle cylinder 4 | | | | | | | | | | | | | | | | | | | | |
| yarn type | T | N | T | N | T | N | T | N | T | N | T | N | T | N | T | N | T | N | T | N |

Fig. 5A

| dial needle | 1 | 2 | | | | | | | | | | | | | | | |
|---|---|---|---|---|---|---|---|---|---|---|---|---|---|---|---|---|---|
| under needle | 2 | 1 | 1 | 1 | 1 | 1 | 1 | 1 | 1 | 1 | 1 | 1 | 1 | 1 | 1 | 1 | 1 |

Fig. 5B

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| dial 4 | | | | | | | | | | | | | | | | | | | | | | | | |
| dial 3 | | | | | | | | | | | | | | | | | | | | | | | | |
| dial 2 | | | | | | | | | | | | | | | | | | | | | | | | |
| dial 1 | | | | | | | | | | | | | | | | | | | | | | | | |
| needle cylinder 1 | < | < | < | < | < | < | < | < | < | < | < | < | < | < | < | < | < | < | < | < | < | < | < | − |
| needle cylinder 2 | < | < | < | < | < | < | < | < | < | < | < | < | < | < | < | < | < | < | < | < | < | < | − | < |
| needle cylinder 3 | < | < | < | < | < | < | < | < | < | < | < | < | < | < | < | < | < | < | < | < | < | < | < | − |
| needle cylinder 4 | < | < | < | < | < | < | < | < | < | < | < | < | < | < | < | < | < | < | < | < | < | < | − | < |
| yarn type | N1 | N1 | N1 | N1 | N1 | N1 | N1 | N1 | N2 | N2 | N2 | N2 | N2 | N2 | N2 | N2 | N2 | N2 | N2 | N2 | N2 | N2 | N2 | N2 |

Fig. 6A

| dial needle | | | | |
|---|---|---|---|---|
| under needle | 1 | 2 | 3 | 4 |

Fig. 7A formula (1)

Fig. 8

MOISTURE-RESPONSE DEFORMING FABRIC

CROSS-REFERENCE TO RELATED APPLICATION

This application claims priority to Taiwan Application Serial Number 110146632, filed Dec. 13, 2021, which is herein incorporated by reference.

BACKGROUND

Field of Invention

The present disclosure relates to a fabric, and particularly relates to a moisture-response deforming fabric.

Description of Related Art

With the improvement of the living standard in today's society, people's demand for functional textiles gradually increases, and with the continuous coming out of the various functional textiles, the development of the functional textiles with specific purposes has also become more and more complete.

For wearable textiles, they often adhere to the user's skin as the user's sweat or the ambient humidity increases, which greatly reduces the wearing comfort. Therefore, how to reduce the adhesion between the wearable textile and the user's body and thereby enhance the wearing comfort is an important issue for the textile industry.

SUMMARY

The present disclosure provides a moisture-response deforming fabric which has a good moisture-response and air-permeable adjustment performance.

According to some embodiments of the present disclosure, the moisture-response deforming fabric includes 40 parts by weight to 70 parts by weight of an ordinary yarn and 30 parts by weight to 60 parts by weight of a moisture-response stretching nylon yarn. A water-vapour permeability index (imt) of the moisture-response deforming fabric is greater than or equal to 0.35 under a measurement of the validation FTTS-FP-161.

In some embodiments of the present disclosure, the moisture-response stretching nylon yarn is prepared from a reagent including the following components: 80 parts by weight to 95 parts by weight of lactam, 1 part by weight to 4 parts by weight of linear aliphatic dicarboxylic acid; 4 parts by weight to 16 parts by weight of polyetherdiamine; and 0.2 parts by weight to 0.6 parts by weight of diethylenetriamine (DETA).

In some embodiments of the present disclosure, the moisture-response deforming fabric is a double-layer lattice knitted fabric.

In some embodiments of the present disclosure, the moisture-response deforming fabric is a double-layer striped knitted fabric.

In some embodiments of the present disclosure, the moisture-response deforming fabric is a double-layer mesh fabric.

In some embodiments of the present disclosure, the moisture-response deforming fabric is a double-layer houndstooth fabric.

In some embodiments of the present disclosure, the moisture-response deforming fabric is a single-layer bourellete fabric.

In some embodiments of the present disclosure, an air-permeability difference of the moisture-response deforming fabric between dry and wet conditions is between 21.02% and 59.47% under a measurement of the ASTM D737 standard method.

In some embodiments of the present disclosure, under a relative humidity between 60% and 100%, a moisture regain of the moisture-response stretching nylon yarn when absorbing moisture is substantially equal to a moisture regain of the moisture-response stretching nylon yarn when releasing moisture.

In some embodiments of the present disclosure, the moisture-response stretching nylon yarn is a draw textured yarn, a fiber specification of the moisture-response stretching nylon yarn is between 0.8 dpf and 3.5 dpf, a yarn strength of the moisture-response stretching nylon yarn is between 3.5 g/d and 4.5 g/d, and an elongation of the moisture-response stretching nylon yarn is between 40% and 50%.

In the aforementioned embodiments of the present disclosure, since the moisture-response deforming fabric includes an appropriate amount of the ordinary yarn and an appropriate amount of the moisture-response stretching nylon yarn, and the moisture-response stretching nylon yarn has a good elongation property when absorbing moisture and has a good shrinkage recovery property when releasing moisture. Therefore, the moisture-response deforming fabric can deform to a corresponding degree under various humidity, thereby having a good moisture-response and air-permeable adjustment performance. On the other hand, since the moisture-response deforming fabric has a high water-vapour permeability index, the moisture-response deforming fabric can effectively release the sweat generated by the wearer's body, thereby achieving the effect of cooling and maintaining comfort and dryness.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

The present disclosure provides a moisture-response deforming fabric, which includes an appropriate amount of an ordinary yarn and an appropriate amount of a moisture-response stretching nylon yarn. By giving the moisture-response deforming fabric an appropriate ratio of the yarns, and through the elongation property of the moisture-response stretching nylon yarn when absorbing moisture as well as the shrinkage recovery property of the moisture-response stretching nylon yarn when releasing moisture, the moisture-response deforming fabric can be provided with various degrees of deformation (e.g., deformation such as porosity variation, three-dimensional height variation (i.e., air chamber variation)) under different humidity, so as to be provided with a good moisture-response and air-permeable adjustment performance.

The moisture-response deforming fabric of the present disclosure includes 40 parts by weight to 70 parts by weight of the ordinary yarn and 30 parts by weight to 60 parts by weight of the moisture-response stretching nylon yarn. By giving the moisture-response deforming fabric an appropriate ratio of the yarns, and through the elongation property of the moisture-response stretching nylon yarn when absorbing moisture as well as the shrinkage recovery property of the moisture-response stretching nylon yarn when releasing moisture, the moisture-response deforming fabric can be provided with a good moisture-response and air-permeable adjustment performance. A water-vapour permeability index (imt) of the moisture-response deforming fabric is greater than or equal to 0.35 under a measurement of the validation FTTS-FP-161. Hence, the sweat produced by the wearer's body is effectively released, so as to achieve the effect of cooling and maintaining comfort and dryness. As such, the moisture-response deforming fabric of the present disclosure can be applied to functional outdoor and sports clothing, intimate clothing, high-comfort work clothing (e.g., work clothing in military and police fields or in industrial and commercial fields), or fabrics that require a moisture-response function. It should be noted that, in some embodiments, the moisture-response deforming fabric may be composed of 40 parts by weight to 70 parts by weight of the ordinary yarn and 30 parts by weight to 60 parts by weight of the moisture-response stretching nylon yarn, and merely with such a configuration, the above-mentioned moisture-response deforming fabric can be provided with a good moisture-response and air-permeable adjustment performance. However, the present disclosure is not limited thereto. In some other embodiments, for example, dyeing and finishing process or other post-treatment can be applied to provide the moisture-response deforming fabric with a better moisture-response and air-permeable adjustment performance.

Figure 8:
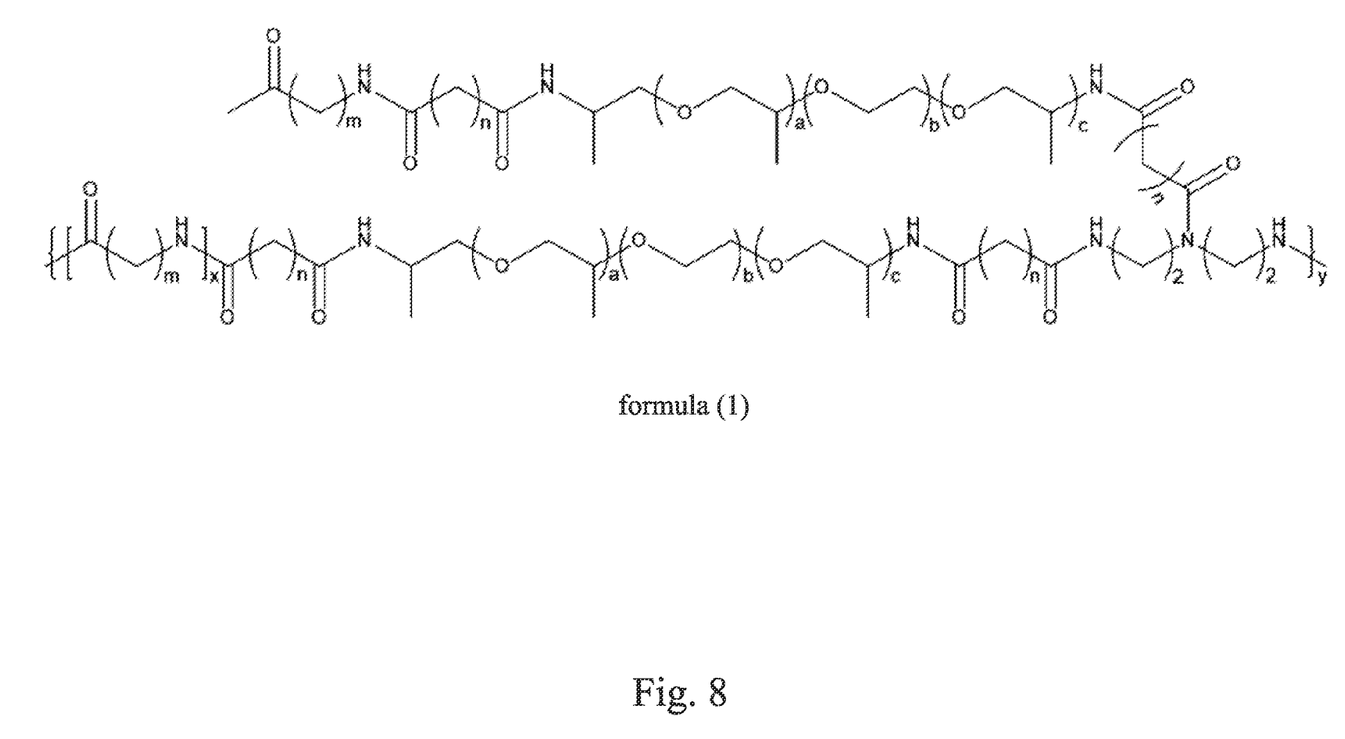
FIG. 8 is a chemical formula that shows "formula (1)" as that term is used throughout this disclosure.

In some embodiments, the ordinary yarn may be a polyester yarn, a nylon yarn, or a combination thereof. Specifically, the material of the polyester yarn may include but not limited to polyethylene terephthalate (PET), and the material of the nylon yarn may include but not limited to nylon 6. In some embodiments, the moisture-response stretching nylon yarn may have a structure represented by formula (1), which is provided in FIG. 8, in which (a+c) is an integer ranging from 3 to 8, b is an integer ranging from 8 to 40, m is an integer ranging from 3 to 11, n is an integer ranging from 2 to 16, x is an integer ranging from 100 to 220, and y is an integer ranging from 1 to 6. In some embodiments, the moisture-response stretching nylon yarn may be prepared from reagents including lactam, linear aliphatic dicarboxylic acid, polyetherdiamine, and diethylenetriamine (DETA). Specifically, 80 parts by weight to 95 parts by weight of the lactam, 1 part by weight to 4 parts by weight of the linear aliphatic dicarboxylic acid, 4 parts by weight to 16 parts by weight of the polyetherdiamine, and 0.2 parts by weight to 0.6 parts by weight of the diethylenetriamine are copolymerized to form the moisture-response stretching nylon yarn. By ensuring the ratio of each agent to fall within the above-mentioned range, it is helpful to improve the degree of polymerization of the moisture-response stretching nylon yarn.

In some embodiments, the lactam may have, for example, 4 to 12 carbons, and the linear aliphatic dicarboxylic acid may have, for example, 4 to 18 carbons. In some preferred embodiments, the lactam may be caprolactam having 6 carbons, and the linear aliphatic dicarboxylic acid may be adipic acid having 6 carbons. As such, when the ordinary yarn in the moisture-response deforming fabric is the nylon yarn, the material homogeneity between the moisture-response stretching nylon yarn and the ordinary yarn can be improved, thereby improving the recyclability of the moisture-response deforming fabric. In some embodiments, the polyetherdiamine may have the structure represented by formula (2):

formula (2), in which (a+c) is an integer ranging from 3 to 8, and b is an integer ranging from 8 to 40. In some embodiments, a weight average molecular weight of the polyetherdiamine may be between 600 g/mole and 2200 g/mole, thereby providing good reactivity. Since the ether group in the polyetherdiamine is easy to form a hydrogen bond with the water molecule, the moisture-response stretching nylon yarn can be provided with good hygroscopicity and good flexibility. On the other hand, since the secondary amine group in the diethylenetriamine can form a covalent bond with the carboxylic acid group of the linear aliphatic dicarboxylic acid to further form a micro-cross-linked structure having good fluidity as well as elasticity, the moisture-response stretching nylon yarn can be provided with a good elongation property and a good shrinkage recovery property.

The moisture-response stretching nylon yarn can have a good elongation property when absorbing moisture and a good shrinkage recovery property when releasing moisture. In some embodiments, the moisture-response stretching nylon yarn can be a single component yarn without the need to be combined with other materials to form a bicomponent composite yarn such as a core/sheath or side-by-side bicomponent composite yarn, so as to make the manufacturing process of the moisture-response stretching nylon yarn easy to be recycled, thereby having the advantages of low manufacturing cost and environmental protection. In some embodiments, the moisture-response stretching nylon yarn may be a draw textured yarn (DTY), which has a high degree of curl to provide fluffy softness. As such, when the moisture-response stretching nylon yarn is applied to the moisture-response deforming fabric, the deformation degree of the moisture-response deforming fabric when sensing variation of moisture can be improved, thereby improving the moisture-response and air-permeable adjustment performance of the moisture-response deforming fabric, and reducing the stickiness caused by the contact between the moisture-response deforming fabric and the users' body when the body sweats. In addition, when the moisture-response stretching nylon yarn is the draw textured yarn, the defects generated during the manufacturing process of the moisture-response deforming fabric can be reduced, thereby improving the hand feeling and wearing comfort of the moisture-response deforming fabric. In some embodiments, a fiber specification of the moisture-response stretching nylon yarn may be between 0.8 dpf and 3.5 dpf, a yarn strength of the moisture-response stretching nylon yarn may be between 3.5 g/d and 4.5 g/d, and an elongation of the moisture-response stretching nylon yarn may be between 40% and 50%. Accordingly, the degree of deformation required by the moisture-response stretching nylon yarn during moisture absorption and moisture release can be met.

Figure 1A:
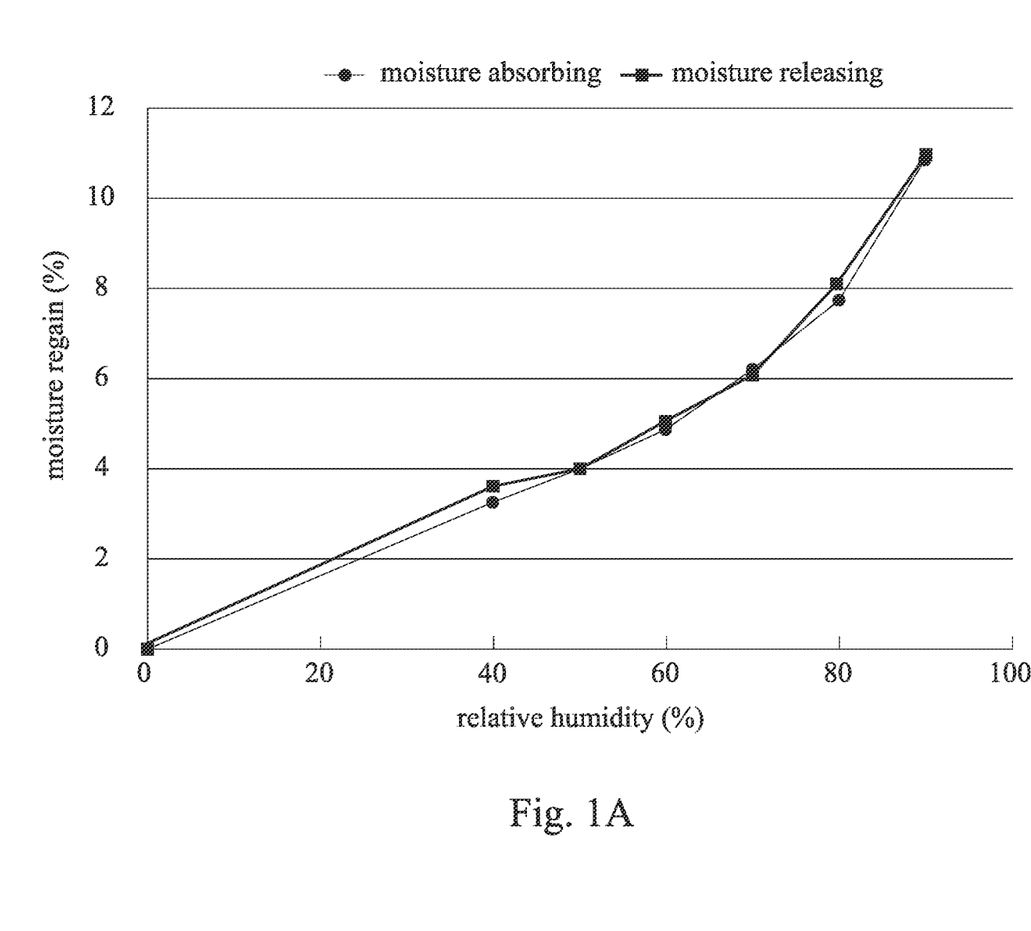
FIG. 1A and FIG. 1B illustrate the hysteresis curves of a moisture-response stretching nylon yarn under different ambient temperatures according to some embodiments of the present disclosure.
Figure 1B:
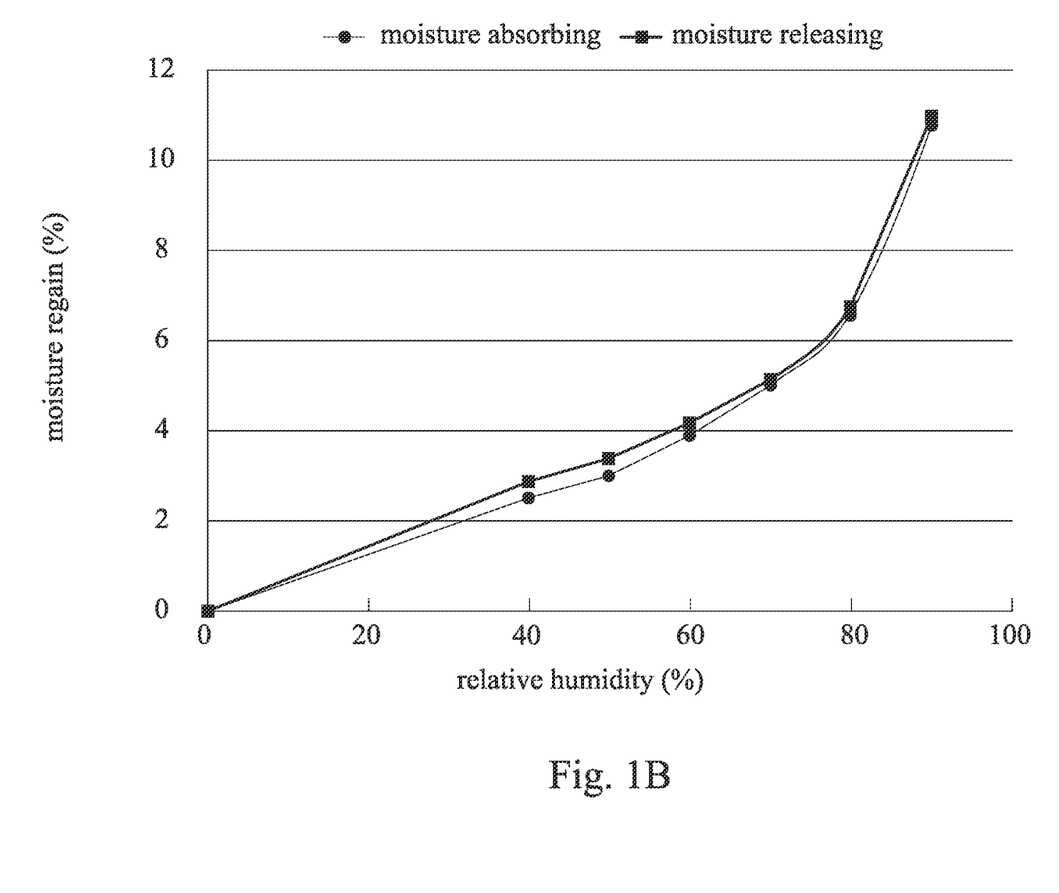

On the other hand, since the moisture-response stretching nylon yarn of the present disclosure has both high moisture-absorbing performance and high moisture-releasing performance, the moisture-response stretching nylon yarn has barely no hysteresis effect. Specifically, reference is made to FIG. 1A and FIG. 1B, which illustrate the hysteresis curves of a moisture-response stretching nylon yarn under different ambient temperatures according to some embodiments of the present disclosure, in which the ambient temperature of FIG. 1A is 20° C., while the ambient temperature of FIG. 1B is 30° C. As shown in FIG. 1A and FIG. 1B, whether under an ambient temperature of 20° C. or 30° C., when a relative humidity of the environment is between 60% and 100%, a curve of a moisture regain of the moisture-response stretching nylon yarn when absorbing moisture is substantially overlapped with a curve of a moisture regain of the moisture-response stretching nylon yarn when releasing moisture. That is, under given ambient temperature and humidity, the moisture regain of the moisture-response stretching nylon yarn when absorbing moisture is substantially equal to the moisture regain of the moisture-response stretching nylon yarn when releasing moisture. It can be seen that the moisture-response stretching nylon yarn can have almost the same moisture absorption rate and moisture release rate, that is, without hysteresis effect, so as to fully activate the moisture-absorbing elongation mechanism and the moisture-releasing shrinkage mechanism. It should be understood that the term "substantially" mentioned in the present disclosure refers to the meaning of "within ±0.3% of a given value or range thereof." In other words, the aforementioned "the moisture regain of the moisture-response stretching nylon yarn when absorbing moisture is substantially equal to the moisture regain of the moisture-response stretching nylon yarn when releasing moisture" refers to the meaning of "the difference between the moisture regain of the moisture-response stretching nylon yarn when absorbing moisture and the moisture regain of the moisture-response stretching nylon yarn when releasing moisture falls within 0.3% of the moisture regain of the moisture-response stretching nylon yarn when absorbing (releasing) moisture."

Based on the elongation property of the moisture-response stretching nylon yarn when absorbing moisture and the shrinkage recovery property of the moisture-response stretching nylon yarn when releasing moisture, the moisture-response deforming fabric of the present disclosure can have larger fabric pores and a greater three-dimensional height variation after moisture absorption, and the moisture-response deforming fabric can return to its initial fabric size after moisture release/drying, thereby providing a good moisture-response and air-permeable adjustment performance. In some embodiments, the moisture-response and air-permeable adjustment performance of the moisture-response deforming fabric can be further adjusted through the weave design of the moisture-response deforming fabric. In detail, through a variety of weave designs, the moisture-response deforming fabric can have different degrees of porosity variations and three-dimensional height variations, thereby providing a wide range of applications. In more detail, the moisture-response deforming fabric of the present disclosure can be knitted by, for example, a circular knitting machine, and the present disclosure represents a various weave designs of the moisture-response deforming fabric through multiple knitting sequence diagrams and multiple knitting needle combination diagrams. More specifically, reference is made to FIG. 2A to FIG. 6B, in which FIG. 2A, FIG. 3A, FIG. 4A, FIG. 5A, and FIG. 6A are knitting sequence diagrams of moisture-response deforming fabrics according to some embodiments of the present disclosure, and FIG. 2B, FIG. 3B, FIG. 4B, FIG. 5B, and FIG. 6B are knitting needle combination diagrams of the knitting sequence diagrams shown in FIG. 2A, FIG. 3A, FIG. 4A, FIG. 5A, and FIG. 6A, respectively.

Figure 2A:
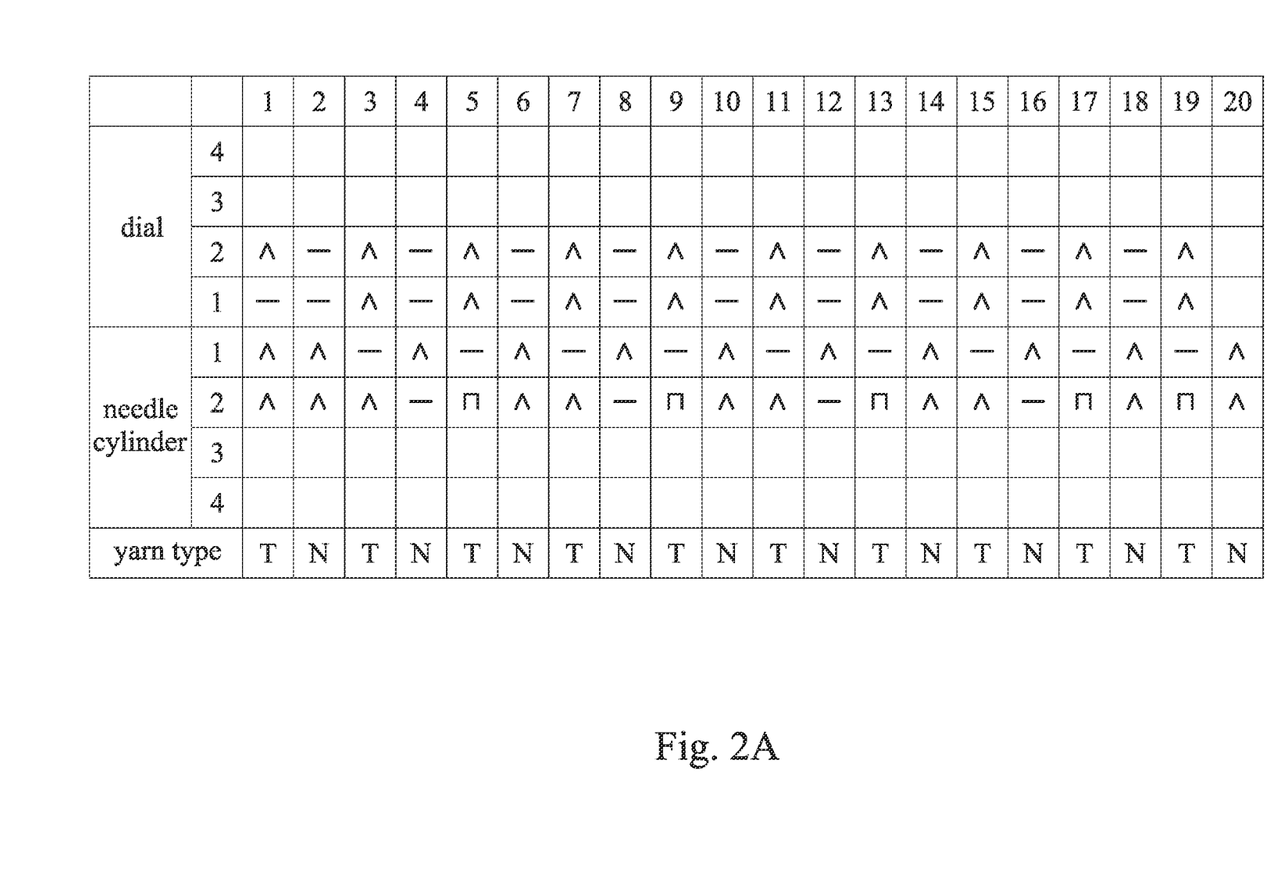
FIG. 2A, FIG. 3A, FIG. 4A, FIG. 5A, and FIG. 6A are knitting sequence diagrams of moisture-response deforming fabrics according to some embodiments of the present disclosure.
Figure 2B:
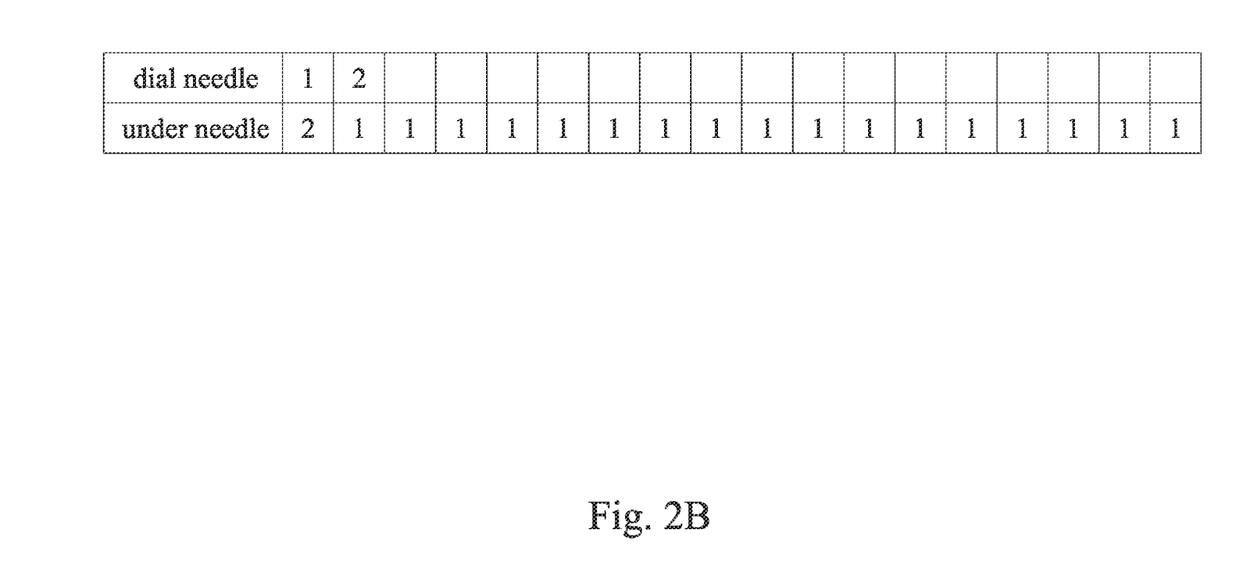
FIG. 2B, FIG. 3B, FIG. 4B, FIG. 5B, and FIG. 6B are knitting needle combination diagrams of knitting sequence diagrams shown in FIG. 2A, FIG. 3A, FIG. 4A, FIG. 5A, and FIG. 6A, respectively.
Figure 3A:
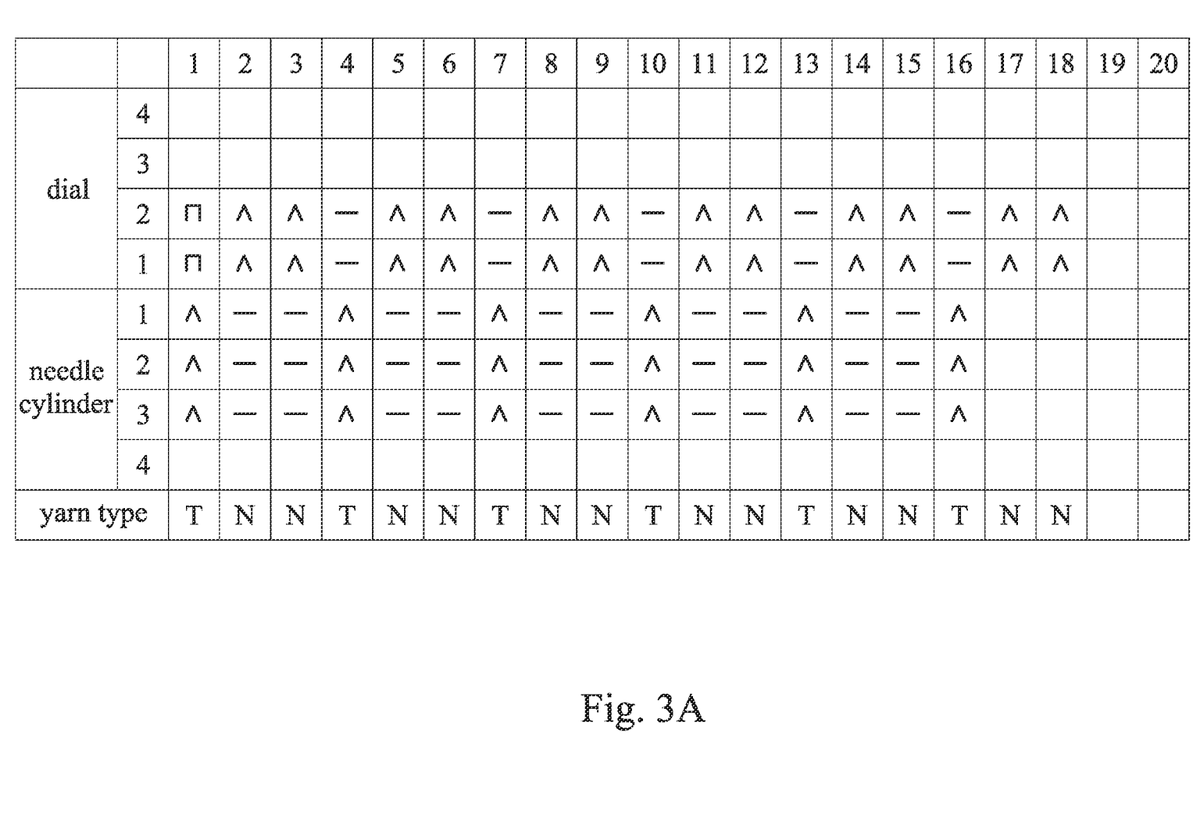
Figure 3B:
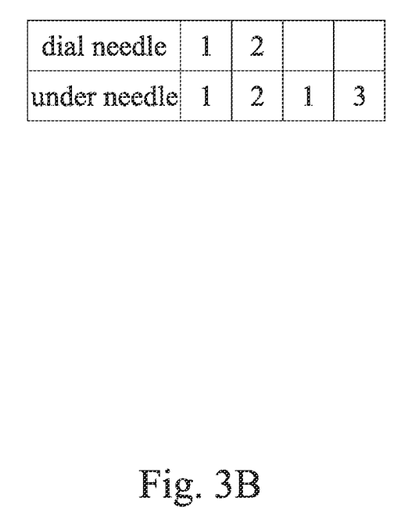
Figure 4A:
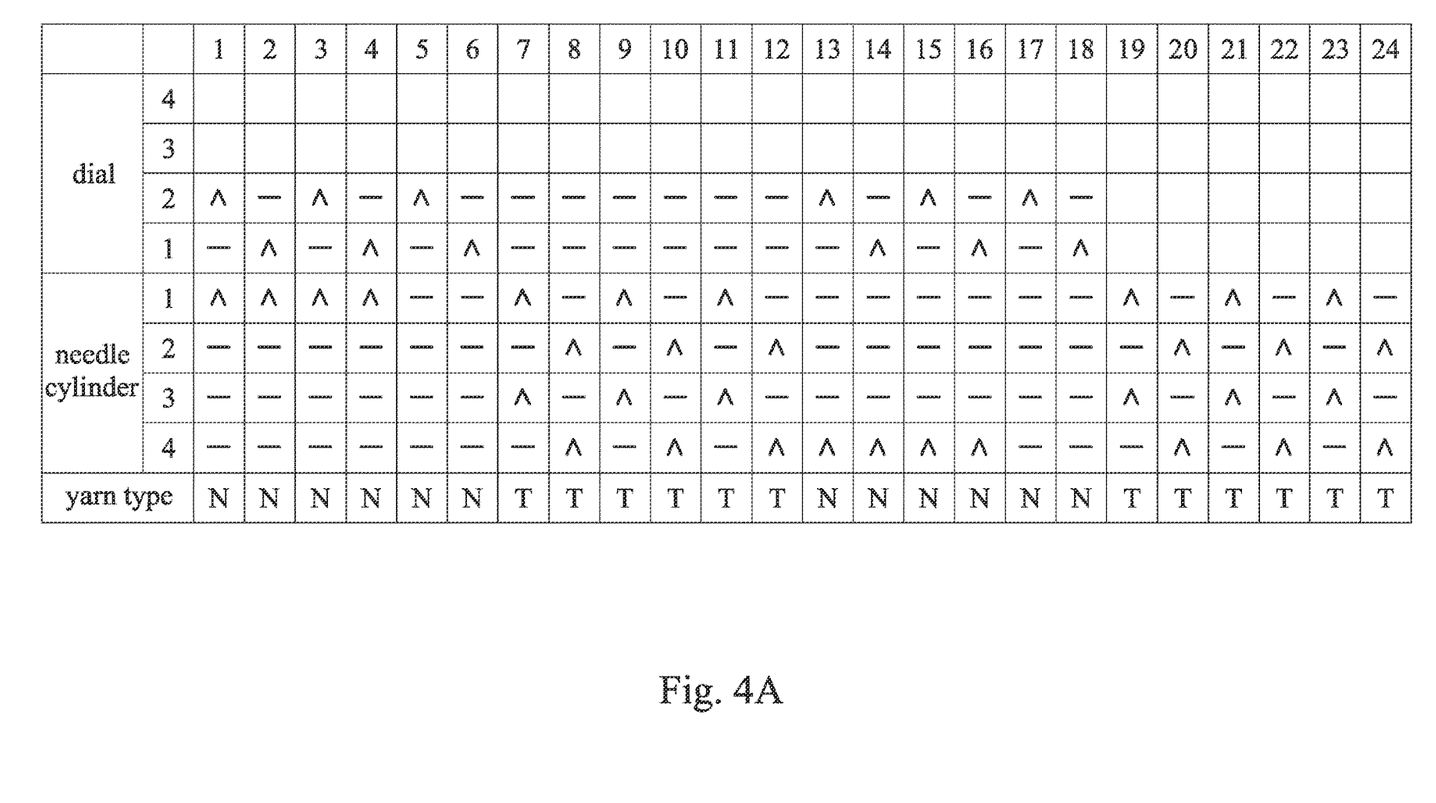
Figure 4B:
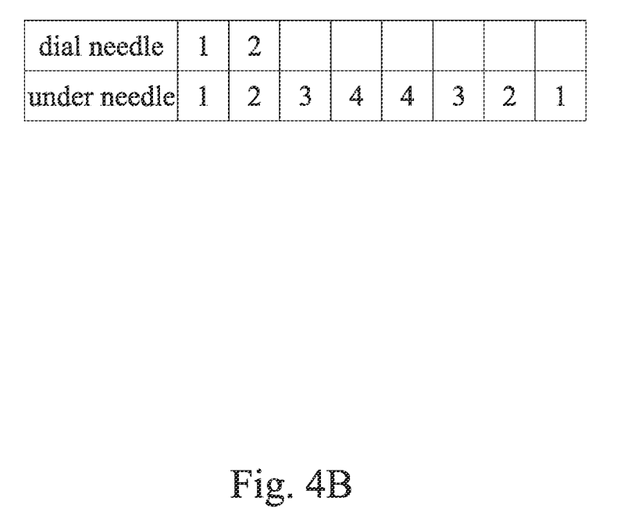
Figure 5A:
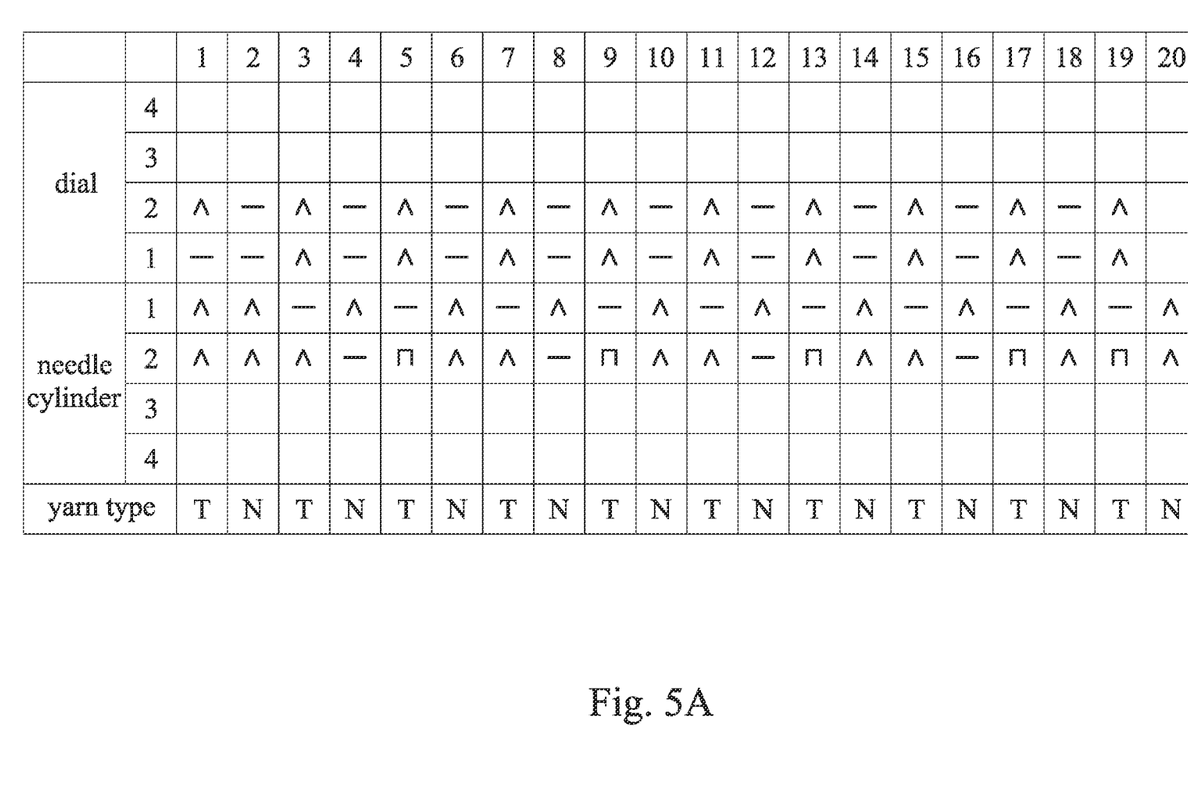
Figure 5B:
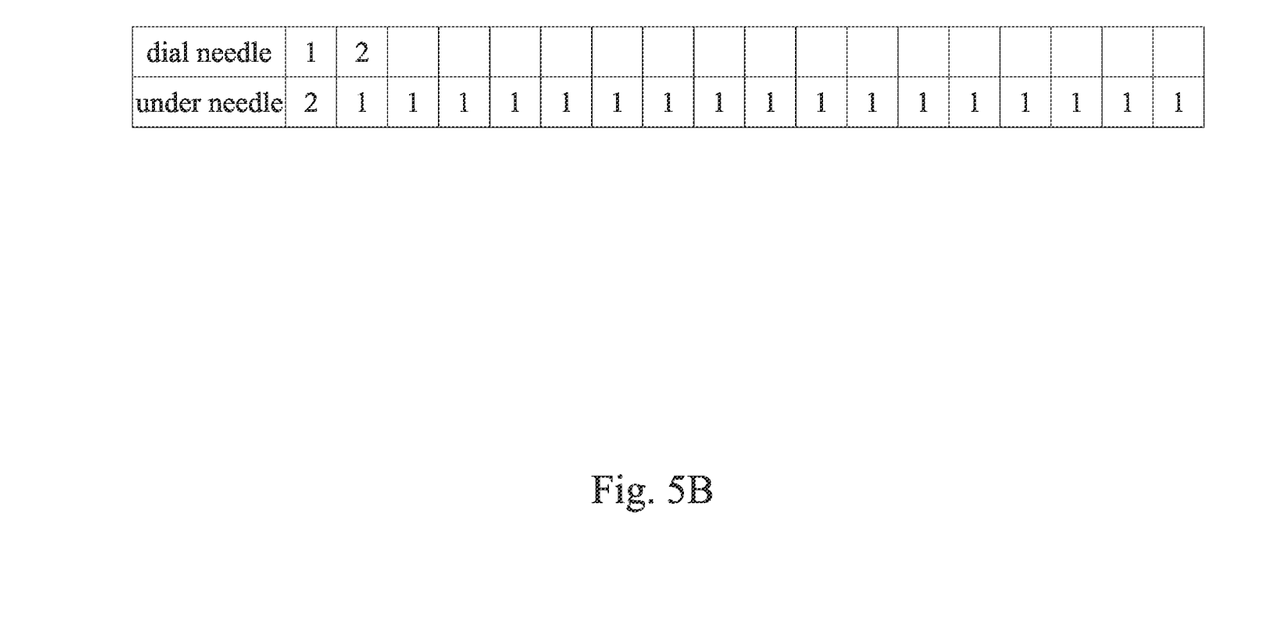
Figure 6A:
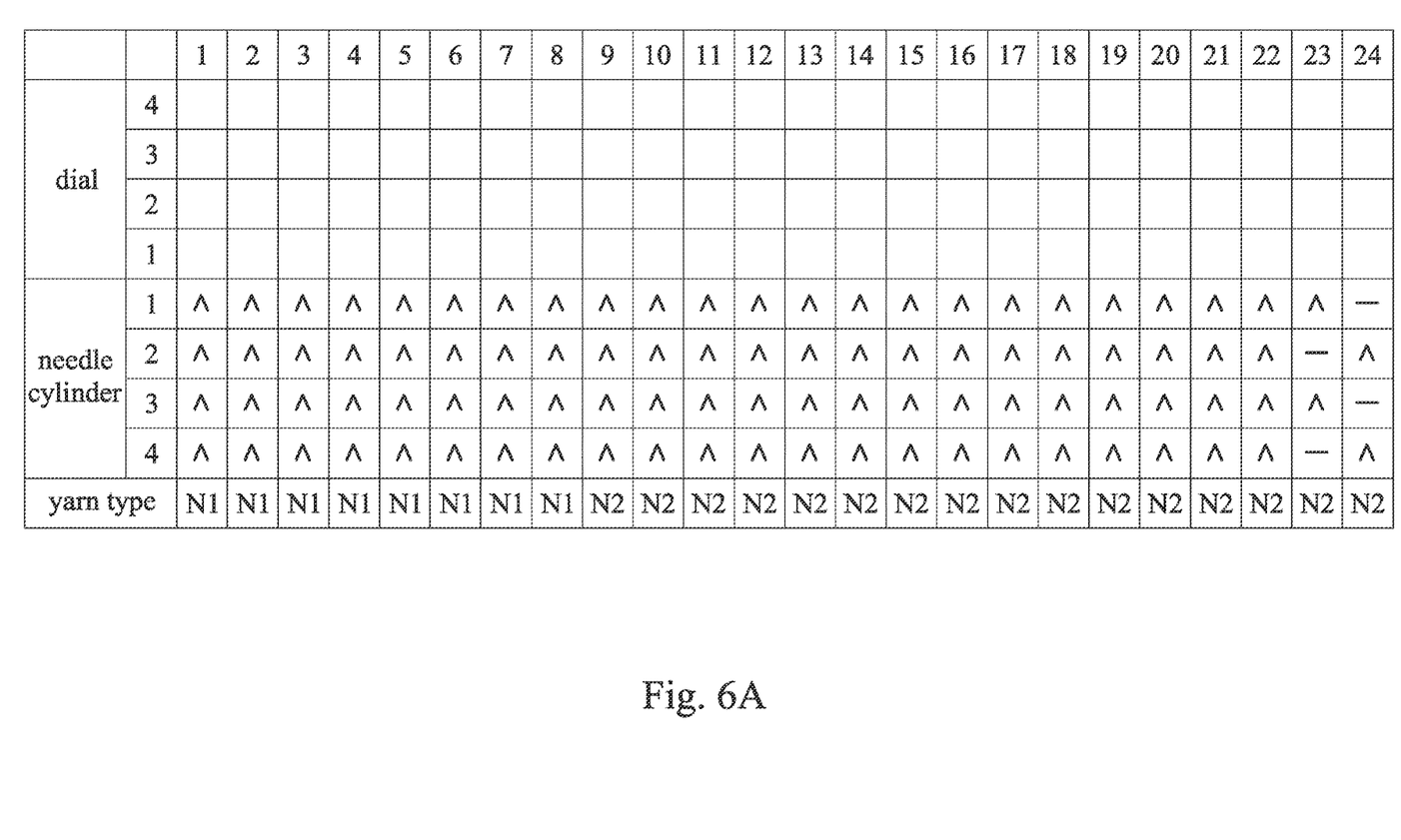
Figure 6B:
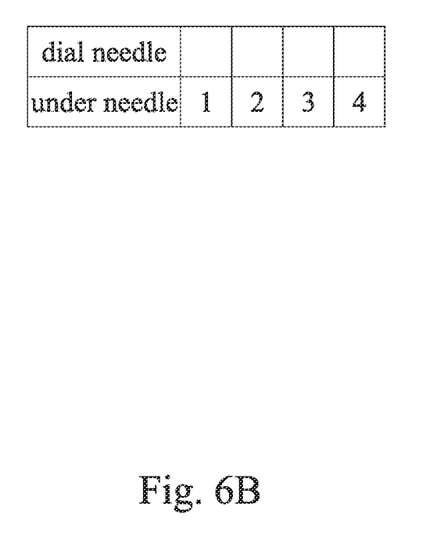

Specifically, the moisture-response deforming fabric knitted with the knitting sequence diagram and the knitting needle combination diagram of FIG. 2A and FIG. 2B is a double-layer lattice knitted fabric, the moisture-response deforming fabric knitted with the knitting sequence diagram and the knitting needle combination diagram of FIG. 3A and FIG. 3B is a double-layer striped knitted fabric, the moisture-response deforming fabric knitted with the knitting sequence diagram and the knitting needle combination diagram of FIG. 4A and FIG. 4B is a double-layer mesh fabric, the moisture-response deforming fabric knitted with the knitting sequence diagram and the knitting needle combination diagram of FIG. 5A and FIG. 5B is a double-layer houndstooth fabric, and the moisture-response deforming fabric knitted with the knitting sequence diagram and the knitting needle combination diagram of FIG. 6A and FIG. 6B is a single-layer bourellete fabric. It should be understood that in FIG. 2A, FIG. 3A, FIG. 4A, and FIG. 5A, the polyester yarn (e.g., PET yarn) is represented by the symbol "T", and the moisture-response stretching nylon yarn is represented by the symbol "N"; in FIG. 6A, the moisture-response stretching nylon yarn is represented by the symbol "N1", and the nylon yarn (e.g., nylon 6 yarn) is represented by the symbol "N2".

In the following description, various tests will be performed on the moisture-response deforming fabric of the present disclosure to further verify the efficacy of the present disclosure. It should be understood that the present disclosure should not be limited by the following embodiments.

<Experiment 1: Tests of Porosity Variations and Air-Permeability Differences on Fabrics Between Dry and Wet Conditions>

In this experiment, the nylon 6 yarn and the moisture-response stretching nylon yarn were woven with various ratios into various fabrics (the fabric of Comparative Example 1 and the moisture-response deforming fabrics of Embodiments 1 to 4) with a plain weave, and the tests of porosity variations and air-permeability differences on fabrics between dry and wet conditions before and after moisture absorption were performed on each fabric. The porosity variations of the fabric between dry and wet conditions were calculated by formula (3): "formula (3): porosity variation of the fabric between dry and wet conditions (%)={[porosity (wet)−porosity (dry)]/porosity (dry)}×100%," in which porosity (wet) was calculated by formula (4): <Formula (4): porosity (wet) (%)=[1−coverage (wet)]×100%," and porosity (dry) was calculated by formula (5): "Formula (5): porosity (dry) (%)=[1−coverage (dry)]×100%." The air-permeability differences on fabrics between dry and wet conditions were measured by the ASTM D737 standard method (Note: take the air-permeability of the fabric as a reference value when the relative humidity is 65%, and measure the air-permeability of fabric under the relative humidity between 90% and 100%). The results are shown in Table 1.

TABLE 1

| | Content of Yarn (Part by Weight) | | Porosity | Air-Permeability |
|---|---|---|---|---|
| | Nylon 6 Yarn | Moisture-response Stretching Nylon Yarn | Variation between Dry and Wet Conditions (%) | Difference between Dry and Wet Conditions (%) |
| Comparative Example 1 | 100 | 0 | 8.0 | 3.60 |
| Embodiment 1 | 75 | 25 | 29.8 | 17.73 |
| Embodiment 2 | 50 | 50 | 41.1 | 21.44 |
| Embodiment 3 | 25 | 75 | 46.8 | 22.04 |
| Embodiment 4 | 0 | 100 | 45.6 | 25.77 |

Compared with the fabric of Comparative Example 1, the porosity variation and the air-permeability difference between dry and wet conditions of the moisture-response deforming fabric of Embodiment 1 were respectively increased by 2.73 times and 3.93 times, and the porosity variation and the air-permeability difference between dry and wet conditions of the moisture-response deforming fabric of Embodiment 2 were respectively were further respectively increased by 4.14 times and 4.96 times. It can be seen that when the ratio of nylon 6 yarn and moisture-response stretching nylon yarn were each 50 parts by weight, the moisture-response deforming fabric had significant porosity variation and the air-permeability difference between dry and wet conditions. In addition, it is worth noting that it can be found from Embodiments 3 to 4 that when the content of the moisture-response stretching nylon yarn continuously increased, the porosity variation and the air-permeability difference between dry and wet conditions were limited. Accordingly, based on cost considerations, the content of the ordinary yarn is preferably between 40 parts by weight and 70 parts by weight, and the content of the moisture-response stretching nylon yarn is preferably between 30 parts by weight and 60 parts by weight.

<Experiment 2: Tests of Three-Dimensional Height Variation, Air-Permeability Difference Between Dry and Wet Conditions, and Water-Vapour Permeability on Moisture-Response Deforming Fabrics with Various Weave Designs>

In this experiment, the ordinary yarn and the moisture-response stretching nylon yarn were woven into moisture-response deforming fabrics with various weave designs (Embodiments 5 to 9), and the tests of three-dimensional height variation, air-permeability difference between dry and wet conditions, and water-vapour permeability were performed on each moisture-response deforming fabric before and after moisture absorption. The air-permeability difference between dry and wet conditions of the moisture-response deforming fabrics were measured by the ASTM D737 standard method (Note: take the air-permeability of the fabric as a reference value when the relative humidity is 65%, and measure the air-permeability of fabric under the relative humidity between 90% and 100%). The three-dimensional height variation of the moisture-response deforming fabrics were obtained by measuring the three-dimensional (Z-axis) height differences of fabrics before and after moisture absorption under the above environmental conditions. The water-vapour permeability index of moisture-response deforming fabric was measured under the validation FTTS-FP-161. The detailed description of each moisture-response deforming fabric is shown in Table 2, and the results are shown in Table 3.

TABLE 2

| | | Content of Yarn (Part by Weight) | |
|---|---|---|---|
| | Weave Design | Ordinary Yarn | Moisture-response Stretching Nylon Yarn |
| Embodiment 5 | FIGS. 2A-2B double-layer lattice knitted fabric | 50 (PET) | 50 |
| Embodiment 6 | FIGS. 3A-3B double-layer striped knitted fabric | 33 (PET) | 67 |
| Embodiment 7 | FIGS. 4A-4B double-layer mesh fabric | 53 (PET) | 47 |
| Embodiment 8 | FIGS. 5A-5B double-layer houndstooth fabric | 50 (PET) | 50 |
| Embodiment 9 | FIGS. 6A-6B single-layer bourellete fabric | 56 (nylon 6) | 44 |

TABLE 3

| | Air-Permeability Difference between Dry and Wet Conditions (%) | Three-dimensional Height Variation (mm) | Water-vapour Permeability Index (w/o unit) |
|---|---|---|---|
| Embodiment 5 | 21.02 | 0.88 | 0.75 |
| Embodiment 6 | 31.84 | 0.43 | 0.59 |
| Embodiment 7 | 28.64 | 0.12 | 0.96 |
| Embodiment 8 | 22.94 | 0.58 | 0.69 |
| Embodiment 9 | 59.47 | N/A | 0.96 |

Note:
The three-dimensional height variation of each embodiment was measured based on the highest point of the sample.

Figure 7A:
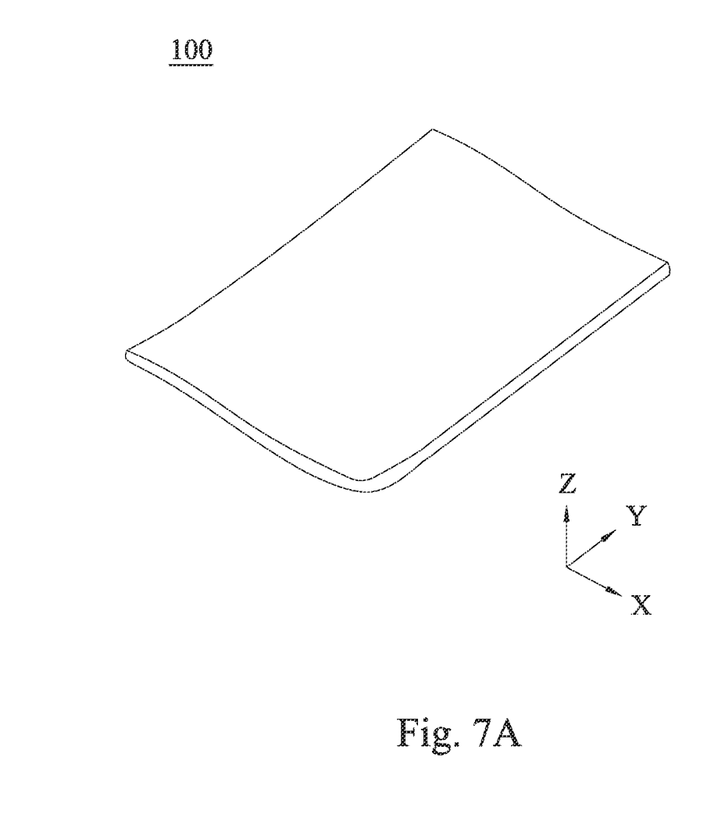
FIG. 7A and FIG. 7B are three-dimensional schematic diagrams of the double-layer lattice knitted fabric before and after moisture absorption, respectively.
Figure 7B:
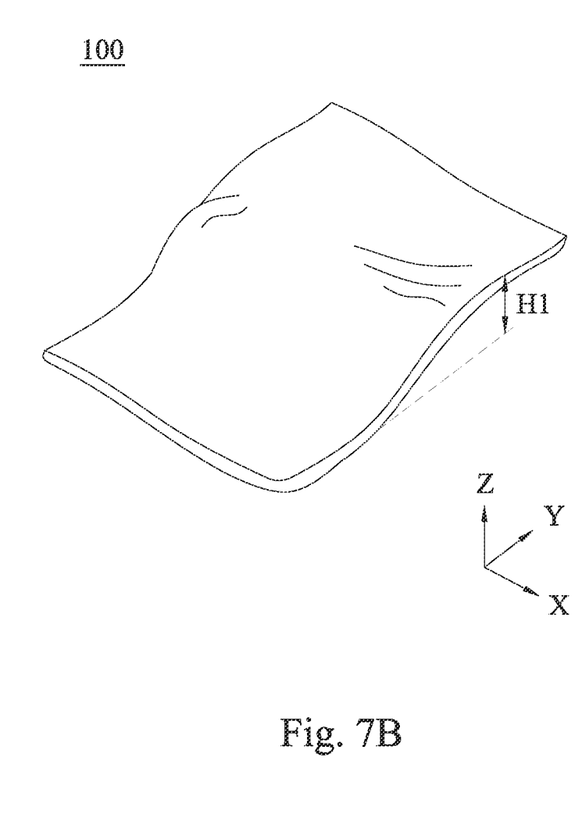

It can be seen from the results in Table 2 that, taking the air-permeability of the moisture-response deforming fabric as the reference value when the relative humidity was 65%, the air-permeability differences of the moisture-response deforming fabrics between dry and wet conditions could be between 21.02% and 59.47% when the relative humidity was between 90% and 100%, and the three-dimensional height variations of the moisture-response deforming fabrics could be between 0.12 mm and 0.88 mm when the relative humidity was between 90% and 100%. It is worth noting that, for the three-dimensional height variation (i.e., the air chamber variation), the ordinary yarn can maintain the two-dimensional structure (X-axis and Y-axis), while the moisture-response stretching nylon yarn can produce a three-dimensional height variation (Z-axis). Therefore, under different weave designs, the moisture-response deforming fabrics could have corresponding three-dimensional height variations. For example, reference is made to FIG. 7A and FIG. 7B, which are three-dimensional schematic diagrams of the double-layer lattice knitted fabric 100 before and after moisture absorption, respectively. It can be seen from FIGS. 7A and 7B that, taking the three-dimensional height of the double-layer lattice knitted fabric 100 before moisture absorption under a relative humidity of 65% as the reference value, the three-dimensional height H1 of the double-layer lattice knitted fabric 100 after moisture absorption under a relative humidity of 90% to 100% was 0.88 mm. Accordingly, the three-dimensional height variation of the double-layer lattice knitted fabric 100 was estimated to be 0.88 mm. On the other hand, the moisture-response deforming fabric of each embodiment could have a water-vapour permeability index greater than or equal to 0.35, so as to release the sweat generated by the wearer's body, thereby achieving the effect of cooling and maintain comfort and dryness.

In the aforementioned embodiments of the present disclosure, since the moisture-response deforming fabric includes an appropriate amount of the ordinary yarn and an appropriate amount of the moisture-response stretching nylon yarn, and the moisture-response stretching nylon yarn has a good elongation property when absorbing moisture and has a good shrinkage recovery property when releasing moisture. Therefore, the moisture-response deforming fabric can be provided with various degrees of deformation (e.g., deformation such as porosity variation, three-dimensional height variation (i.e., air chamber variation)) under different humidity, so as to be provided with a good moisture-response and air-permeable adjustment performance, and reduce the stickiness caused by the contact between the moisture-response deforming fabric and the users' body when the body sweats. On the other hand, since the moisture-response deforming fabric has a high water-vapour permeability index, the moisture-response deforming fabric can effectively release the sweat generated by the wearer's body, thereby achieving the effect of cooling and maintaining comfort and dryness. In addition, by further changing the weave design of the moisture-response deforming fabric, the moisture-response and air-permeable adjustment performance of the moisture-response deforming fabric can be adjusted, thereby providing a wide range of applications.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A moisture-response deforming fabric, comprising:
   40 parts by weight to 70 parts by weight of an ordinary yarn; and
   30 parts by weight to 60 parts by weight of a moisture-response stretching nylon yarn, wherein the moisture-response deforming fabric is a double-layer striped knitted fabric, a double-layer houndstooth fabric, or a single-layer bourellete fabric, and a water-vapour permeability index (imt) of the moisture-response deforming fabric is greater than or equal to 0.35 under a measurement of the validation FTTS-FP-161.

2. The moisture-response deforming fabric of claim 1, wherein the moisture-response stretching nylon yarn is prepared from a reagent comprising following components:
   80 parts by weight to 95 parts by weight of lactam;
   1 part by weight to 4 parts by weight of linear aliphatic dicarboxylic acid;
   4 parts by weight to 16 parts by weight of polyetherdiamine; and
   0.2 parts by weight to 0.6 parts by weight of diethylenetriamine (DETA).

3. The moisture-response deforming fabric of claim 1, wherein an air-permeability difference between dry and wet conditions of the moisture-response deforming fabric is between 21.02% and 59.47% under a measurement of the ASTM D737 standard method.

4. The moisture-response deforming fabric of claim 1, wherein under a relative humidity between 60% and 100%, a moisture regain of the moisture-response stretching nylon yarn when absorbing moisture is substantially equal to a moisture regain of the moisture-response stretching nylon yarn when releasing moisture.

5. The moisture-response deforming fabric of claim 1, wherein the moisture-response stretching nylon yarn is a draw textured yarn, a fiber specification of the moisture-response stretching nylon yarn is between 0.8 dpf and 3.5 dpf, a yarn strength of the moisture-response stretching nylon yarn is between 3.5 g/d and 4.5 g/d, and an elongation of the moisture-response stretching nylon yarn is between 40% and 50%.

* * * * *